United States Patent [19]

Budde et al.

[11] Patent Number: 4,774,637

[45] Date of Patent: Sep. 27, 1988

[54] MOTOR VEHICLE LIGHT CONNECTOR TERMINAL

[75] Inventors: Wilhelm Budde, Erwitte; Franz Schmuck, Lippstadt; Günter Stracke, Lippstadt; Manfred Vorweg, Lippstadt, all of Fed. Rep. of Germany

[73] Assignee: Hella KG Hueck & Co., Lippstadt, Fed. Rep. of Germany

[21] Appl. No.: 905,855

[22] Filed: Sep. 10, 1986

[30] Foreign Application Priority Data

Sep. 10, 1985 [DE] Fed. Rep. of Germany ....... 3532205

[51] Int. Cl.[4] ................................................ B60Q 1/00

[52] U.S. Cl. ...................................... 362/61; 362/227; 439/395; 439/404; 439/746

[58] Field of Search ............. 339/97 PR, 99 R, 217 S, 339/278 T; 362/61, 80, 227, 249; 439/395, 404, 746

[56] References Cited

U.S. PATENT DOCUMENTS

| | | | |
|---|---|---|---|
| 2,301,919 | 11/1942 | Petry | 339/97 R |
| 3,748,462 | 7/1973 | Newman | 362/227 |
| 4,045,112 | 8/1977 | Rodondi et al. | 339/99 R |
| 4,597,623 | 7/1986 | Krumreich | 339/97 P |

*Primary Examiner*—Samuel Scott
*Assistant Examiner*—Noah Kamen
*Attorney, Agent, or Firm*—Horst M. Kasper

[57] ABSTRACT

The invention relates to a motor vehicle lamp with several light bulbs. The light bulbs are electrically connected by cables with a multiplug connector disposed at the casing of the lamp. The multiple plug connector comprises contact parts produced from sheet metal strips and provided at the center region with an attachment means. The contact parts are formed as flat plugs at one end section while the contact parts are provided at the other end section in each case with a protruding bent off flag. The clamping jaws of a cutter clamping device generated by a slot are set in the flag. The slot runs in the direction of the longitudinal extension of the contact parts. The contact parts are inserted with the flat plugs in slot-shaped openings and are sequentially disposed in a plane with their wide extension at a distance from each other. The neighboring contact parts in a row are rotated by 180 degrees relative to each other about the longitudinal axis. Upon pressing in of the cable into the slot of the cutter clamping means, the clamping jaws penetrate the insulation of the cable and generate an electrical contact between the core of the cable and the contact part.

19 Claims, 4 Drawing Sheets

MOTOR VEHICLE LIGHT CONNECTOR TERMINAL

BACKGROUND OF THE INVENTION

1. Field of the Invention

The invention relates to a motor vehicle light with several light bulbs, which are connected to an electrical power source by electrical cables via a multiple plug connector disposed at the lamp casing. The contact parts are provided by sheet metals strips, have a center region attachment device and are furnished at one end section as a flat connector, which flat connector is inserted into a slot shaped opening of the lamp casing.

2. Brief Description of the Background of the Invention Including Prior Art

Motor vehicle lamps of this kind exhibit a joint cable for light bulbs providing a ground and several cables serving to feed power. The electrical contact between the non-stripped cable is formed both at the light bulb side as well as on the multiple plug connector connection by an insulation displacement connector having contact parts to contact a wire core. The insulation displacement connector comprises two clamping jaws, which are formed by a slot placed into a contact part. By pressing cable into the slot the insulation of the cable is cut such that the clamping jaws contact the core of the cable. The contact parts of the multiple plug connector are produced from sheet metal strips sequentially placed in one or several planes with the wide extension of the end section forming a flat plug. The contact parts can be fixed by attachment means in their center region in each case in a slot shaped opening of the lamp housing. The end section of the contact parts disposed opposite to the flat connectors is provided as an insulation displacement connector. In the case of very small flat plugs the contact parts at the end section forming the insulation displacement connector are provided wider then the flat plug such that it is not possible to place the small flat plugs close enough to each other to achieve a space saving disposition of the contact parts and thus also to be able to construct the multiple plug to be coupled to the multiple plug connector as small as possible.

SUMMARY OF THE INVENTION

1. Purposes of the Invention

It is an object of the present invention to construct a multiple plug connector in a motor vehicle lamp such that also in the case of narrow, densely positioned plug connectors the end section of the contact parts provided for an insulation displacement connector is sufficiently wide to provide sufficient space for feeding in the cables.

It is another object of the present invention to provide a connector part from sheet metal, which can be disposed in a connector casing in a space saving and electrically reliable manner.

It is a further object of the invention to provide a method which allows the secure connection of the lamp wires to input terminals of a lamp casing.

These and other objects and advantages of the present invention will become evident from the description which follows.

2. Brief Description of the Invention

The present invention provides a multiple plug connector terminal for a motor vehicle lamp with several light bulbs where the light bulbs are connected via cable to the multiple plug connector terminal. The multiple plug terminal comprises contact parts made of sheet metal with one end formed as a flat elongated plug section and with a protruding flag bent off along a bending line at an angle relative to the plug section. A slot is provided in the flag in a direction about parallel to the elongated plug section for providing a cutter clamping means that has two clamping jaws that penetrate a cable insulation upon a pressing of a cable into the cutter clamping means thereby providing an electrical contact between the core of the cable and the contact part. A terminal casing has slotted openings disposed in a row sequence. The contact parts are inserted into these slotted openings alternatingly turned by about 180 degrees relative to each other around an axis about parallel to the elongated plug section.

The terminal casing includes cable support means for positioning cable to be connected relative to the contact parts such that a reliable positioning and contact to the contact part is assured, and can be an integral part of a lamp casing.

The slot of the cutter clamping means can be open on the side of the flag directed toward the elongated plug section.

The bending line for the protruding flag can run in the direction of the longitudinal extension of the contact part. The flag can be bent at about a right angle relative to the flat elongated part. The cable support means can comprise in each case two protruding wall shaped extensions running about parallel to each other and about parallel to the angled flag of the contact part and extending opposite to the insertion direction of the contact parts relative to the terminal casing. The wall shaped extensions can be provided with a longitudinal slot open on the side of the approaching contact part where the cable rests at the bottom of the longitudinal slot and the core of the cable contacts the contact part after cutting of the insulation with the clamping jaws. At least one elongated slot of the two wall shaped protrusions can be sufficiently narrow at its base for fixedly clamping the cable in position.

A third wall can connect the two wall shaped protrusions to each other at one of the two longitudinal edge sides and additionally can provide a boundary for the flag of the contact part.

The flat elongated plug of the contact part can comprise a double layer of sheet metal formed by a folding and can further comprise a nose disposed on the elongated plug and directed toward the cutter clamping means. This nose can grip behind an edge of a respective slotted opening of the terminal casing after insertion of the contact part into the terminal casing. In particular, the two layer flat elongated plug can be produced by folding of two side sections of a contact part blank around two bending lines running in the direction of the longitudinal extension of the contact part. The folding can extend along about one third to two thirds of the full length of the contact part, and the flat elongated plug can be slightly wider than an adjoining area.

The flag can have a bending line extending from about 0.1 to 0.4 of the total length of the contact part and can include extensions running in the direction of the flat elongated plug for about 0.1 to 0.3 of the length of the bending line of the flag. The elongated slot in the flag can be provided with rounded edges in the area of about the extension of the flag. The bottom of the elongated slot in the flag can be provided with a side recess for improved retention of a contacted cable wire core.

The length of the nose of the contact part can be from about 5 to 15 percent of the total length of the contact part, and the total width of the nose can be from about 50 to 90 percent of the width of the folded plug section.

The terminal casing can form an integral part of a multiple motor vehicle light casing, which is recessed by at least about 4 percent of the largest diameter of the lamp.

Another aspect of the present invention provides a method for providing a multiple plug connection at a terminal for a motor vehicle lamp with several light bulbs where the light bulbs are connected via cable to the multiple plug connector terminal. The method comprises cutting a sheet metal blank to provide an elongated section and a protruding flag extending from one end of the elongated section where a slot is provided in the flag in a direction about parallel to the elongated plug section for providing a cutter clamping means which has two clamping jaws which penetrate a cable insulation upon a pressing of a cable into the cutter clamping means thereby providing an electrical contact between a core of a cable and a formed contact part. The protruding flag is bent along a bending line at an angle relative to the flat elongated plug section, and the flat elongated plugs are inserted into a row sequence of slotted openings of a terminal casing. The flat elongated plugs are alternatingly turned 180 degrees relative to each other around an axis about parallel to the elongated plug section. A cable is positioned in the terminal casing, which includes cable support means for positioning cable to be connected relative to the plug parts such that a reliable positioning and contact to the contact part is assured.

The sheet metal piece can be cut so as to provide for an about double width in the area of the flat elongated plug connector, and the area of the flat elongated plug connector can be folded to generate a double layer of sheet metal. A nose can be bent from part of the double sheet metal layer disposed on the elongated plug and directed toward the cutter clamping means and can grip behind an edge of a respective slotted opening of the terminal casing after insertion of the flat elongated plug into the terminal casing.

In particular, two side sections of a contact part blank for the flat elongated plug connector can be folded around two bending lines running in the direction of the longitudinal extension of the contact part for producing a two layer flat elongated plug. The folding can extend about one third to two thirds of the full length of the contact part, and the flat elongated plug can be slightly wider than an adjoining area.

The present invention in particular provides that the contact parts produced from the sheet metal strip are furnished in each case with a protruding, bent off flag, where the flag provides a slot that generates clamping jaws for an insulation displacement connector. The slot runs in the direction of the longitudinal plug extension of the contact parts. Neighboring contact parts are turned in sequence by 180 degrees with respect to each other around their longitudinal axes.

Such a construction achieves not only a multiple plug connector that is relatively small because of the space saving disposition of the contact parts but also achieves a multiple plug to be connected by the multiple plug connector that is relatively small.

It is furthermore advantageous if the slot of the insulator displacement connector is open at a free end of the flat plug connector and if the bending line of the bend of the flag runs in the direction of the longitudinal extension of the contact part. In this context it is advantageous if the flag takes off at a right angle relative to the flat plug. With such a contact part the insulation of the cable can be cut simultaneously with the insertion of the flag connector into the slot shaped opening of the lamp housing.

It is a further advantage if the bent off flag of the contact part is guided in each case by two wall shaped protrusions running parallel with respect to each other and extending opposite to the insertion direction of the contact parts. The wall shaped protrusions are provided with longitudinal slot openings opposite to the insertion direction of the contact part. The cable is placed on the bottom of this longitudinal slot where the core of the cable contacts the contact part after cutting of the insulation by clamping jaws, and at least one longitudinal slot of the two wall shaped protrusions is formed narrow enough at its base that it clamps the inserted cable between its jaws. According to this embodiment the cable is safely maintained in the longitudinal slots of the wall shaped protrusions until an insertion of the contact parts is made into the slot shaped openings of the lamp casing.

Furthermore, it is advantageous if the two wall shaped protrusions are connected to each other by a third wall along one of the two narrow longitudinal sides. This third wall forms at the same time a boundary for the contact flag of the flat connector. Thus there is prevented an undesirable springing and also a deformation of the two clamping jaws during cutting of the insulation of the cable.

It is further advantageous if the flat plug of the contact part is doubled by folding of the sheet metal strips and if the folded section is provided with a locking nose directed to the insulation displacement connector. After insertion of the contact part the nose grips behind an edge of the slot shaped opening of the lamp casing. The contact parts are thereby fixed in a self-locking way after insertion into the slot shaped openings of the lamp housing.

It is a further advantage if the doubled flat plug is produced by folding of the two side sections of the contact part around two bending lines disposed parallel with respect to each other and running in the direction of the longitudinal extension of the flat elongated plug. With such a construction the bending lines of the foldings and the bending line of the bent off flag can run cross wise to the rolling direction of the sheet metal such that the contact part is provided with high strength.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
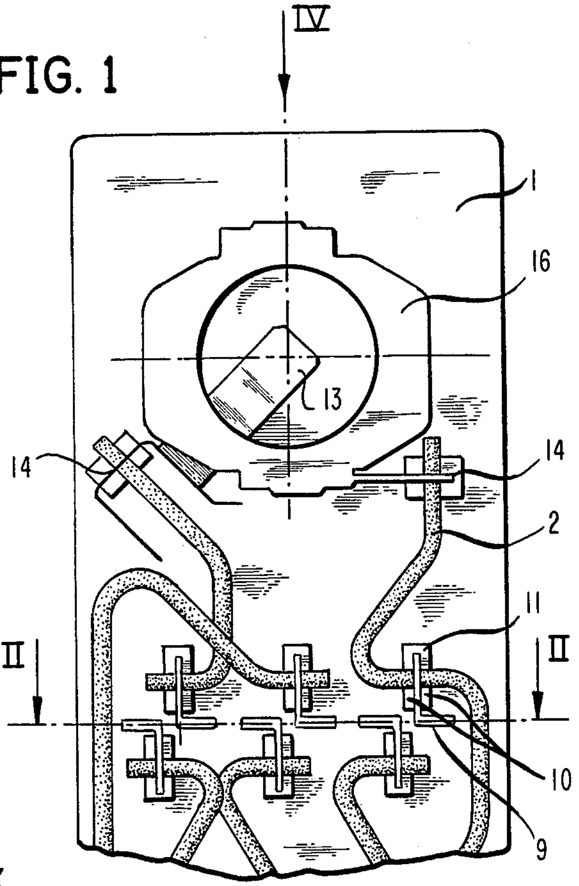
FIG. 1 is a partial schematic view of the inside of a casing of motor vehicle lamp with the light bulb sockets connected via wire cables to contact parts of a multiple plug connector.

In accordance with the present invention there is provided a motor vehicle lamp with several light bulbs connected in an electrically conducting manner by cables with a multiple plug connector disposed at the lamp casing. The contact parts 3 of the multiple plug connector are produced from sheet metal strips and are provided in the center region with an attachment means. One of the contact parts 3 is formed as a flat connector 4. The contact parts 3 with the flat connector 4 are inserted in slot shaped openings of the lamp casing. The contact parts 3 are disposed in sequence in one or several planes running about parallel at a distance. In order to provide a connection of the non-stripped cable, the contact parts 3 are provided at the other end section with an insulator displacement connector 5, which comprises two clamping jaws formed by a slot 15. The clamping jaws penetrate the insulation of the cable at its point of insertion into the slot 15 and achieve an electrical contact between the core of the cable and the contact part 3. In particular the contact parts 3 produced from the sheet metal strip are provided with a protruding, bent off flag 8. The slot 15 in the flag 8 generates the clamping jaws of the insulator displacement connector 5 and runs in the longitudinal direction of the contact part 3. The contact parts 3 are disposed in sequence and are turned by 180 degrees around their longitudinal direction with respect to each other.

The slot 15 of the insulator displacement connector 5 is opened toward the free end of the flat plug 4 formed.

The bending line 71 of the bent flag 8 runs preferably in the longitudinal direction of the contact part 3. The flag 8 is preferably bent at a right angle relative to the flat plug part 4.

The bent flag 8 of the contact part 3 is guided in each case by two wall shaped protrusions 10 that are parallel to each other and extend opposite to the insertion direction of the contact parts 3. The wall shaped protrusions 10 exhibit the longitudinal slot 12 which opens against the insertion direction of the contact part 3. The cable 2 is placed at the bottom of the longitudinal slot 12 where after the cutting of the insulation the core of the cable contacts the contact part 3 via the clamping jaws.

At least one longitudinal section 12 of the two wall shaped protrusions 10 is formed and spaced narrow enough that it clamps an inserted cable 2. The two wall shaped protrusions 10 are connected to each other at one of the two narrow longitudinal sides by the third wall 11. This third wall 11 also forms a boundary for the contact flag 8. The flat plug 4 of the contact part 3 is provided with a snap-in nose 7 by folding of the sheet metal strip in the double rear end region and the locking nose 7 is associated with the folded section. Upon insertion of the contact part 3 the locking nose 7 grips the edge of the slot shaped opening 9 of the lamp housing.

The doubled flat plug 4 is produced by folding of the two side sections 6 of the contact part around two bending lines 73, 74 running parallel to each other in longitudinal direction of the flat plug 4.

Referring now to FIG. 1, there is shown in a partial schematic view a lamp casing 1 of a motor vehicle lamp, where the light bulb sockets 16 (compare FIG. 4) are connected via wire cable to a multiple plug connector for providing a connection to a power source. FIG. 1 illustrates in principle a positioning of plug connectors in a motor vehicle lamp. The supporting casing parts cannot be recognized from this figure. These casing parts are shown in more detail in FIG. 4. The multiple plug connector comprises several contact parts 3 made from sheet metal strips. The contact parts 3 exhibit at one end section a flat plug 4 and at the other end section an insulator displacement connector 5. The flat plugs 4 are doubled by folding of the side section 6 of the contact part by employing two bending lines 73, 74 running parallel to each other and in the longitudinal direction of the flat plug 4. The folded section 6 forms tongues which are directed toward the insulator displacement connector 5 and are bent outward as a snap-in nose 7. The other end section of the contact part 3 is provided with a protruding flag 8, which is bent at a right angle with respect to the flat plug. The insulator displacement connector 5 is provided at the the flag 8.

The slot 15 (FIG. 3) runs in the longitudinal direction of the contact part 3 and is open toward the free end of the flat plug 4. The bending line 71 of the bent flag 8 runs in the longitudinal direction of the contact part 3. The elongated slot 15 in the flag 8 can be provided with round edges in the area of about the extension of the flag 8. The bottom of the elongated slot 15 in the flag 8 can be provided with a side recess 75 for improved retention of a contacted cable wire core.

Figure 2:
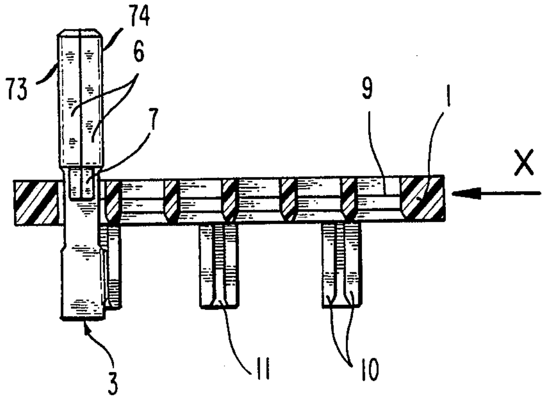
FIG. 2 is a sectional view according to section line II with only one contact part inserted into the lamp casing of the multiple plug connector.

FIG. 2 shows in particular the provisions 7 for locking with the nose 7 at a contact part 3.

Figure 3:
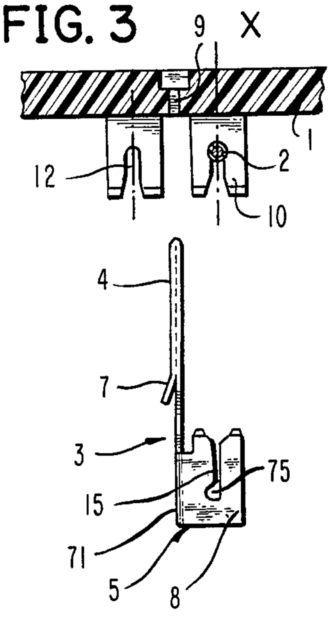
FIG. 3 is the view from the direction X onto the lamp casing and contact part before insertion of the contact part into the lamp casing.

FIG. 3 relates to FIG. 2 as a sectional view where however the plug connector which is shown in assembled position in FIG. 2 is now in FIG. 3 positioned as it would be before assembly and insertion into the terminal. The contact parts 3 can be inserted with their flat plug sides 4 into slot-shaped openings 9 of the lamp casing. The slot-shaped openings 9 are opened corresponding to the cross-section of the flat plug 4 and they are placed in a dense sequence in the longitudinal direction. The contact parts 3 are placed in the slot shaped openings 9 of the lamp casing alternatingly turned at the angle of 180 degrees around their longitudinal direction.

Upon insertion of the flat plug 4 into the slot-shaped openings 9, the flags 8 are guided between two wall shaped protrusions 10 of the lamp casing 1, which protrusions 10 run parallel to each other. The front face of the flag 8 slides along a third wall 11 joining the two walls 10 together. The walls 10 are provided with longitudinal slots 12 which open on the insertion side of the contact parts 3. The longitudinal slots 12 are formed narrow at the base such that an inserted cable 2 is clamped between them. Upon insertion of the contact part 3 into the slot-shaped opening 9 of the lamp casing, the clamping jaws of the insulator displacement connector 5 cut the insulation of the cable 2 and connect the contact part 3 with the core of the cable 2 in the end position. At the same time, when the contact part 3 reaches its end position, the snap-in nose 7 grips the edge of the slot-shaped opening 9 of the lamp casing 1. The light bulb socket holder 42 and the contact strips 13 contacting with the center pole of the light are also provided with an insulator displacement connector 14 where the contact strips 13 contact the center core of the cable.

Figure 4:
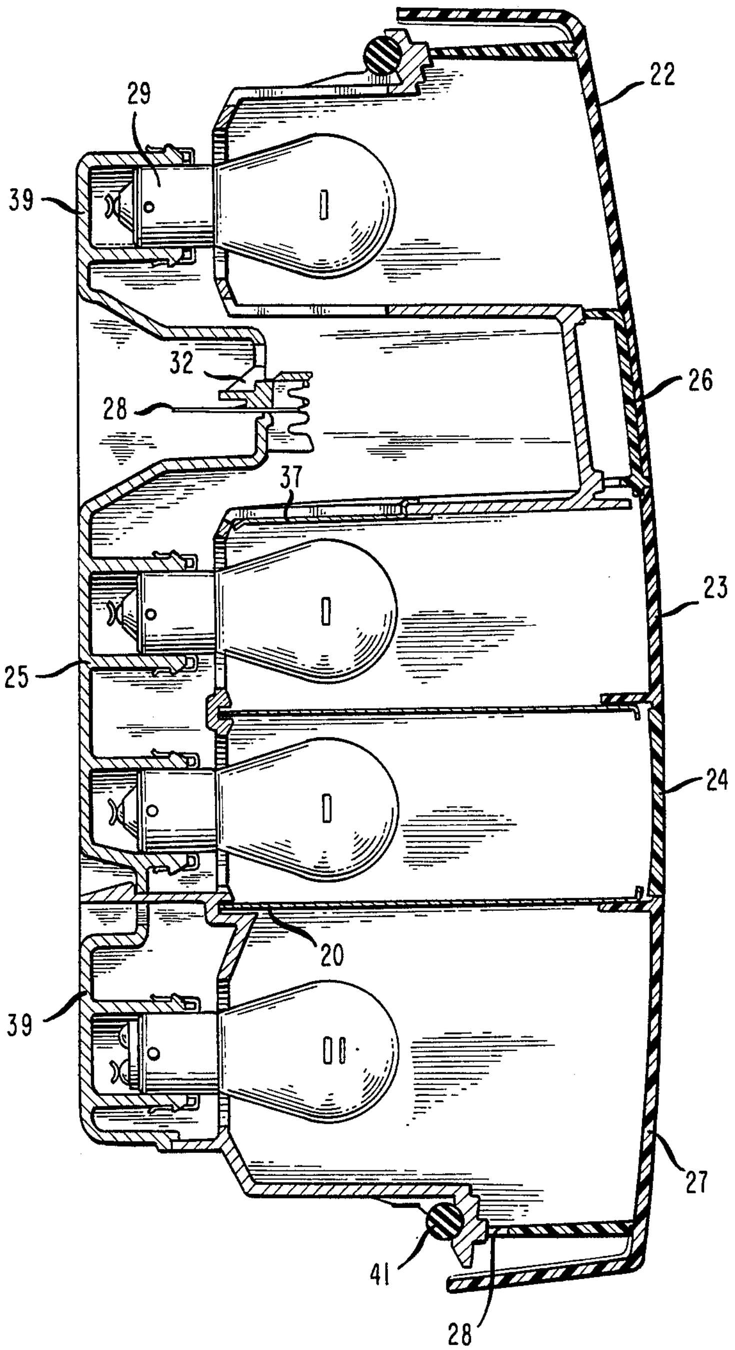
FIG. 4 is an overall sectional view of the lamp housing employed in connection with the present invention, which corresponds to section line IV—IV of FIG. 1.

FIG. 4 gives an overall view of the placing of the connector into an automobile lamp. A casing 39 provides general support for the various parts of the multiple lamp. The plug itself is shown at 28 supported by a housing which in particular comprises a reinforcement part 32. It can be seen from FIG. 4 that the contact terminal casing is recessed into the area of the motor vehicle lamp which is not directly employed for the light bulb and is made here as a single piece with the casing for the lamps. In particular the plug connector of the present invention substantially takes more or less the same space as one of the lamps of a multiple lamp motor vehicle light. According to FIG. 4 the area of the plug connector is protected at the outside by a red reflector plate 26. The brake light bulb socket can be recognized and is typical for one of the lamps employed. The red braking light emits through red plexiglass 22 of the transparent cover and a yellow blinking light emits its radiation in the area 23. Plexiglass is a trademark for thermoplastic poly (methylmethacrylate) type polymers. A lamp for reverse driving emits its radiation at plexiglass 24 and a red backing light 27 is again provided with a transmitting plexiglass cover. The lamp cover is provided with the ventilation hole 28. The several sections of the lamp can be separated with sheet metal separating walls 20. The socket frame of the lamps includes caps 25 providing support to the lamps. 37 shows a heat sink sheet metal piece. An elastic sealing ring is illustrated at 41.

Figure 5:
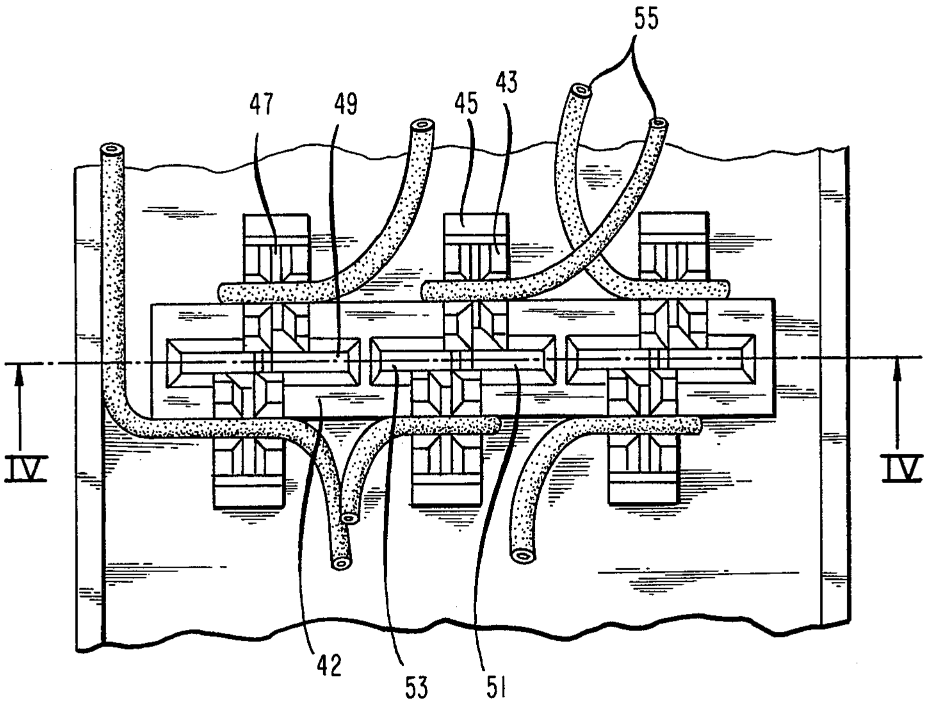
FIG. 5 is an enlarged view of the connector section schematically illustrated in FIG. 1.

FIG. 5 is a substantially sectional view along section line II—II of FIG. 1. FIG. 5 is an enlarged view and includes more detail showing the supporting structure for the contact parts. Parts of the supporting terminal case structure are shown at 42. 43 is a top view of wall 10 of FIG. 3. 45 in FIG. 5 is a top view of a side wall 11 (FIG. 2). 47 indicates the top of a flag 8. 49, 51 shows the rear end of the plug section. 53 shows an empty hole for a possible connection not employed in FIG. 5. A cable is recognized at 55.

Figure 6:
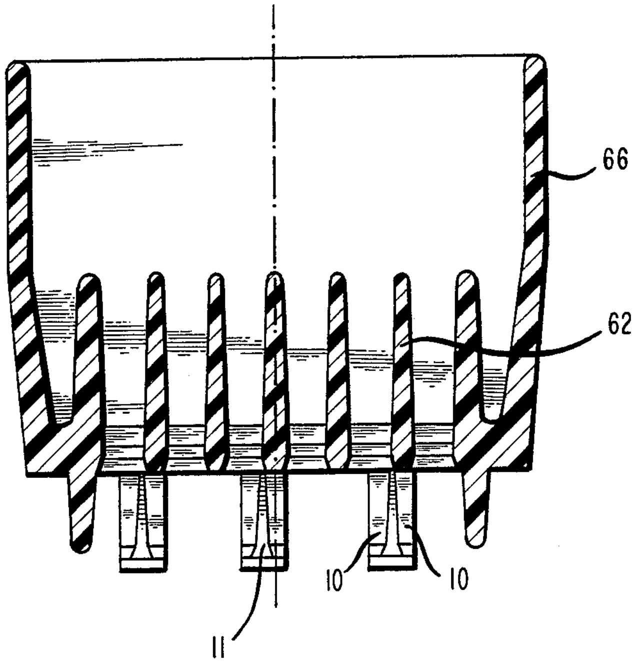
FIG. 6 is view of a plug connector terminal casing section.

FIG. 6 is another view of the terminal case structure similar to that of FIG. 2. It can be recognized that certain extensions 62 are provided, which can serve to protect the plug connectors from bending and for guiding plug and plug connector when forming electrical contact. The cable holding parts 10 and the third wall 11 can also be recognized in FIG. 6. The deeply recessed nature of the connector terminal can also be recognized from FIG. 6, where the bottom cable of the lamps continues at 66.

Such a vehicle lamp can advantageously be produced in large numbers since in a first operating step the cables are inserted and clamped into the longitudinal slots of the lamp casing and in a second operating step an electrically conducting connection of the core of the cable is made in each case to the contact strip contacting a center pole of a respective light bulb and to contact parts of the multiple plug connector.

It will be understood that each of the elements described above, or two or more together, may also find a useful application in other types of plug connector terminals differing from the types described above.

While the invention has been illustrated and described as embodied in the context of a motor vehicle light connector terminal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A multiple plug connector terminal for a motor vehicle lamp with several light bulbs where the light bulbs are connected via cable to the multiple plug connector terminal comprising contact parts made of sheet metal having one end formed as a flat elongated plug section and having a protruding flag bent off along a bending line generally parallel to the plug section, where a slot is provided in the flag in a direction about parallel to the elongated plug section furnishing a cutter clamping means which has two clamping jaws which penetrate a cable insulation of a cable being pressed into the cutter clamping means and which thereby provide an electrical contact between the core of the cable and the contact part;

a terminal casing having slotted openings disposed in a row sequence, into which slotted openings the contact parts are inserted alternatingly turned by about 180 degrees relative to each other around an axis about parallel to the elongated plug section, and the terminal casing including cable support means for positioning cable to be connectedly clamped to the contact parts such that a reliable positioning and contact to the contact part is assured.

2. The multiple plug connector terminal for a motor vehicle lamp according to claim 1 wherein the terminal casing is an integral part of a lamp casing.

3. The multiple plug connector terminal for a motor vehicle lamp according to claim 1 where the slot of the cutter clamping means is open on the side of the flag directed toward the elongated plug section.

4. The multiple plug connector terminal for a motor vehicle lamp according to claim 1 wherein the flag is bent at about a right angle relative to the flat elongated part.

5. The multiple plug connector terminal for a motor vehicle lamp according to claim 1 wherein the cable support means comprises in each case two protruding wall shaped extensions running about parallel to each other and about parallel to the angled flag of the contact part and extending opposite to the insertion direction of the contact parts relative to the terminal casing, where the wall shaped extensions are provided with a longitudinal slot open on the side of the approaching contact part where the cable rests at the bottom of the longitudinal slot and where the core of the cable contacts the contact part after cutting of the insulation with the clamping jaws.

6. The multiple plug connector terminal for a motor vehicle lamp according to claim 5 wherein at least one elongated slot of the two wall shaped protrusions is sufficiently narrow at its base for fixedly clamping the cable in position.

7. The multiple plug connector terminal for a motor vehicle lamp according to claim 5 further comprising a third wall connecting the two wall shaped protrusions to each other at one of two longitudinal edge sides and where the third wall additionally provides a boundary for the flag of the contact part.

8. The multiple plug connector terminal for a motor vehicle lamp according to claim 1 wherein the flat elongated plug of the contact part comprises a double layer of sheet metal based on a folding and further comprising a nose disposed on the elongated plug and directed toward the cutter clamping means, which nose grips behind an edge of a respective slotted opening of the terminal casing after insertion of the contact part into the terminal casing.

9. The multiple plug connector terminal for a motor vehicle lamp according to claim 8 wherein the two layer flat elongated plug is produced by folding the two side sections of a contact part blank around two bending lines running in the direction of the longitudinal extension of the contact part.

10. The multiple plug connector terminal for a motor vehicle lamp according to claim 8 wherein the folding extends along about one third to two thirds of the full length of the contact part and where the width of the flat elongated plug is slightly larger as compared to the width of an adjoining section.

11. The multiple plug connector terminal for a motor vehicle lamp according to claim 8 wherein the flag has a bending line extending from about 0.1 to 0.4 of the total length of the contact part and where the flag includes extensions running in a direction about parallel to the flat elongated plug toward an end of the plug remote from the flag for about 0.1 to 0.3 of the length of the bending line of the flag.

12. The multiple plug connector terminal for a motor vehicle lamp according to claim 11 wherein the elongated slot in the flag is provided with rounded edges in the area of about the extension of the flag.

13. The multiple plug connector terminal for a motor vehicle lamp according to claim 11 wherein the bottom of the elongated slot in the flag is provided with a side recess for improved retention of a contacted cable wire core.

14. The multiple plug connector terminal for a motor vehicle lamp according to claim 8 wherein the length of the nose of the contact part is from about 5 to 15 percent of the total length of the contact part and wherein the total width of the nose is from about 50 to 90 percent of the width of the folded plug section.

15. The multiple plug connector terminal for a motor vehicle lamp according to claim 1 wherein the terminal casing forms an integral part of a multiple motor vehicle light casing, which is recessed in an area of the location of the lamp socket by at least about 4 percent of the largest diameter of the lamp.

16. A method for providing a multiple plug connection at a terminal for a motor vehicle lamp with several light bulbs where the light bulbs are connected via cable to the multiple plug connector terminal comprising cutting a sheet metal blank to provide an elongated section and a protruding flag extending from one end of the elongated section where a slot is provided in the flag in a direction about parallel to the elongated plug section furnishing a cutter clamping means which has two clamping jaws which penetrate a cable insulation of a cable being pressed into the cutter clamping means and which thereby provide an electrical contact between a core of a cable and a formed contact part;

bending off the protruding flag along a bending line generally parallel to the flat elongated plug section;

inserting the flat elongated plugs alternatingly turned around by 180 degrees relative to each other around an axis about parallel to the elongated plug section into a terminal casing having slotted openings disposed in a row sequence for passing the flat elongated plugs; and positioning a cable in the terminal casing which includes cable support means for positioning cable to be connectedly clamped to the plug parts such that a reliable positioning and contact to the contact part is assured.

17. The method for providing a multiple plug connection according to claim 16 further comprising cutting the sheet metal piece such as to provide for an about double width in the area of the flat elongated plug connector;

folding the area of the flat elongated plug connector to generate a double layer of sheet metal based on the folding; bending a nose from part of the double sheet metal layer disposed on the elongated plug and directed toward the cutter clamping means;

whereby the nose grips behind an edge of a respective slotted opening of the terminal casing after insertion of the flat elongated plug into the terminal casing.

18. The method for providing a multiple plug connection according to claim 17 wherein the cutting and folding steps comprise folding two side sections of a contact part blank for the flat elongated plug connector around two bending lines running in the direction of the longitudinal extension of the contact part for producing a two layer flat elongated plug.

19. The method for providing a multiple plug connection according to claim 17 wherein the folding extends along for about one third to two thirds of the full length of the contact part and where the width of the flat elongated plug is slightly larger as compared to the width of an adjoining section.

* * * * *